(12) United States Patent
Sily

(10) Patent No.: US 12,203,535 B2
(45) Date of Patent: Jan. 21, 2025

(54) MULTI-SPEED TRANSMISSION FOR A VEHICLE, A VEHICLE, AND A METHOD FOR OPERATING A MULTI-SPEED TRANSMISSION

(71) Applicants: Ningbo Geely Automobile Research & Development Co., Ltd., Ningbo (CN); Zhejiang Geely Holding Group Co., Ltd., Zhejiang (CN)

(72) Inventor: Omar Sily, Borås (SE)

(73) Assignees: Ningbo Geely Automobile Research & Dev. Co., Ltd., Ningbo (CN); Zhejiang Geely Holding Group Co., Ltd., Zhejiang (CN)

( * ) Notice: Subject to any disclaimer, the term of this patent is extended or adjusted under 35 U.S.C. 154(b) by 0 days.

(21) Appl. No.: 18/666,722

(22) Filed: May 16, 2024

(65) Prior Publication Data

US 2024/0301941 A1    Sep. 12, 2024

Related U.S. Application Data

(63) Continuation of application No. PCT/CN2022/134932, filed on Nov. 29, 2022.

(30) Foreign Application Priority Data

Dec. 15, 2021  (EP) .................................... 21214870

(51) Int. Cl.
*F16H 3/66*    (2006.01)
(52) U.S. Cl.
CPC ..... *F16H 3/666* (2013.01); *F16H 2200/0052* (2013.01); *F16H 2200/2007* (2013.01)
(58) Field of Classification Search
CPC ............. F16H 3/666; F16H 2200/0052; F16H 2200/2007
See application file for complete search history.

(56) References Cited

U.S. PATENT DOCUMENTS 4,122,731 A     10/1978  Bendure et al.
8,647,228 B2 *   2/2014  Shim ........................ F16H 3/66
                                                        475/287

(Continued)

FOREIGN PATENT DOCUMENTS

DE              198 21 164 A1     11/1999
DE         10 2017 223373 B4      8/2019

(Continued)

OTHER PUBLICATIONS

International Search Report from corresponding International Application No. PCT/CN2022/134932, mailed on Apr. 11, 2023, 3 pages.

(Continued)

*Primary Examiner* — Derek D Knight
(74) *Attorney, Agent, or Firm* — Tucker Ellis LLP

(57) ABSTRACT

A multi-speed transmission for a vehicle has an extension in an axial direction and includes first and second input shafts, first and second output shafts, and first and second intermediate shafts. The transmission includes an annulus internally toothed first ring gear drivingly connected to the second input shaft and an annulus internally toothed second ring gear releasably connected to the first ring gear. The first intermediate shaft includes first and second gear wheels respectively in engagement with the first ring gear and the second ring gear. The second intermediate shaft includes a third gear wheel in engagement with the first ring gear and a fourth gear wheel in engagement with the second ring gear. The first output shaft includes a fifth gear wheel in engagement with second gear wheel, and the second output shaft includes a sixth gear wheel in engagement with the fourth gear wheel.

15 Claims, 15 Drawing Sheets

(56) References Cited

U.S. PATENT DOCUMENTS 10,781,889 B2 * 9/2020 Kim .................. B60K 6/485
2011/0034287 A1 2/2011 Hart et al.

FOREIGN PATENT DOCUMENTS

| JP | S63 104299 U | 7/1988 |
|----|--------------|--------|
| KR | 20130043330 A | 4/2013 |
| KR | 101348464 B1 | 1/2014 |

OTHER PUBLICATIONS

Extended European Search Report from corresponding European Application No. 21214870.4, mailed on May 11, 2022, 14 pages.

* cited by examiner

MULTI-SPEED TRANSMISSION FOR A VEHICLE, A VEHICLE, AND A METHOD FOR OPERATING A MULTI-SPEED TRANSMISSION

RELATED APPLICATION DATA

This application is a continuation of International Patent Application No. PCT/CN2022/134932, filed Nov. 29, 2022, and claims the benefit of European Patent Application No. 21214870.4, filed Dec. 15, 2021, the disclosures of which are incorporated herein by reference in their entireties.

TECHNICAL FIELD

The present disclosure relates to a multi-speed transmission for a vehicle. The transmission has an extension in an axial direction and comprises a first input shaft, a second input shaft, a first output shaft, a second output shaft, a first intermediate shaft and a second intermediate shaft. The disclosure further relates to a vehicle comprising a multi-speed transmission, and a method for operating a multi-speed transmission.

BACKGROUND

Multi-speed transmissions are used in vehicle applications for providing different gear ratios between at least one power unit and one or more driving wheels of a vehicle. The transmission is part of a vehicle powertrain system and is configured for providing the different gear ratios depending on differing driving conditions of the vehicle. The at least one power unit may for example be arranged as one or more electric motors, one or more internal combustion engines, or combinations of electric motors and internal combustion engines. The transmission may be arranged within the vehicle in a suitable position for efficient power transfer between the at least one power unit and the one or more driving wheels. One common issue with transmission systems that can deliver different speed ratios is that they require relatively large space in the vehicle. This is not desired from a packing and weight perspective, and further due to the complex designs of multi-speed transmissions they involve a high number of components leading to reduced efficiency and high costs.

There is thus a need for improved multi-speed transmissions that have reduced required space, weight, and cost, as well as improved system efficiency.

SUMMARY

An object of the present disclosure is to provide a multi-speed transmission for a vehicle, a vehicle comprising a multi-speed transmission, and a method for operating a multi-speed transmission, where the previously mentioned problems are avoided. This object is at least partly achieved by the features of the independent claims. The dependent claims contain further developments of the multi-speed transmission for a vehicle, and the method for operating a multi-speed transmission.

The disclosure concerns a multi-speed transmission for a vehicle, where the transmission has an extension in an axial direction and comprises a first input shaft, a second input shaft, a first output shaft, a second output shaft, a first intermediate shaft and a second intermediate shaft. The transmission further comprises an annulus internally toothed first ring gear drivingly connected to the second input shaft and an annulus internally toothed second ring gear releasably connected to the first ring gear. The first intermediate shaft comprises a first gear wheel in engagement with the first ring gear and a second gear wheel in engagement with the second ring gear. The second intermediate shaft comprises a third gear wheel in engagement with the first ring gear and a fourth gear wheel in engagement with the second ring gear. The first output shaft comprises a fifth gear wheel in engagement with second gear wheel, and the second output shaft comprises a sixth gear wheel in engagement with the fourth gear wheel. The first ring gear, the first gear wheel, and the third gear wheel are arranged in a first axial plane. The second ring gear, the second gear wheel, and the fifth gear wheel are arranged in a second axial plane. The second ring gear, the fourth gear wheel, and the sixth gear wheel are arranged in a third axial plane.

Advantages with these features are that with very few components, a compact and efficient multi-speed transmission can be achieved. The first intermediate shaft and the second intermediate shaft with the respective gear wheels are arranged inside the first ring gear and the second ring gear for enabling the compact layout of the transmission. The few components involved is providing a compact multi-speed transmission that is simple in design, and the multi-speed transmission with these features are enabling reduced required space, weight, cost, and improved system efficiency. With the design of the multi-speed transmission, a plurality of different gear ratios between torque input into the transmission and torque output from the transmission can be easily achieved.

According to an embodiment, the first ring gear and the second ring gear are concentrically arranged in relation to each other and separated in the axial direction. The first ring gear and the second ring gear are releasably connected to each other via a first clutch. The first intermediate shaft comprises a second clutch arranged between the first gear wheel and the second gear wheel, and the first gear wheel and the second gear wheel are releasably connected to each other via the second clutch. The second intermediate shaft comprises a third clutch arranged between the third gear wheel and the fourth gear wheel, and the third gear wheel and the fourth gear wheel are releasably connected to each other via the third clutch. The concentric arrangement and separation in the axial direction of the ring gears are providing the compact design and layout of the multi-speed transmission. The first clutch is used for selectively connecting the first ring gear and the second ring gear to each other, and for disconnecting first ring gear and the second ring gear from each other. By selectively connecting or disconnecting the first clutch, torque transfer with different gear ratios is enabled. The second clutch and the third clutch can each be arranged in connected and disconnected states, and by selectively connecting or disconnecting the clutches torque transfer with different gear ratios is efficiently enabled.

According to an embodiment, the first input shaft and the first output shaft are connected to each other and formed as a common shaft structure extending in the axial direction. With this configuration of the multi-speed transmission, torque can be transferred directly from the first input shaft to the first output shaft for providing a gear ratio.

According to an embodiment, the first axial plane, the second axial plane, and the third axial plane, are arranged in a parallel relationship to each other and separated in the axial direction of the transmission. The ring gears and the gear wheels are separated in the axial direction into the different parallel planes for enabling the simple and efficient construction of the transmission.

According to an embodiment, the first input shaft, the second input shaft, the first output shaft, the second output shaft, the first intermediate shaft and the second intermediate shaft, are arranged in a parallel relationship to each other in the axial direction of the transmission. The parallel relationship of the shafts is providing a simple construction with efficient engagement between the components involved, enabling the compact design of the transmission.

According to an embodiment, the first input shaft and the second input shaft are concentrically arranged in relation to each other. The first input shaft is arranged as an inner shaft and the second input shaft as an outer shaft concentrically outside the first input shaft. The first output shaft and the second output shaft are concentrically arranged in relation to each other. The first output shaft is arranged as an inner shaft and the second output shaft as an outer shaft concentrically outside the first output shaft. The first input shaft may be arranged as an inner shaft and the second input shaft as an outer hollow shaft concentrically outside the first input shaft. The first input shaft and the second input shaft are arranged to rotate independently of each other and a dual clutch or similar arrangement connected to the input shafts may be used for transferring torque from at least one power unit to one of the first input shaft and the second input shaft. The first output shaft may be arranged as an inner shaft and the second output shaft as an outer hollow shaft concentrically outside the first output shaft. Each of the first output shaft and the second output shaft is arranged for transferring torque to one or more driving wheels of the vehicle.

According to an embodiment, the first gear wheel and the third gear wheel are arranged on radially opposite sides of the first input gear shaft and the first output gear shaft. The second gear wheel and the fourth gear wheel are arranged on radially opposite sides of the first input gear shaft and the first output gear shaft. This configuration is enabling the compact design of the transmission.

According to an embodiment, the second output shaft further comprises a seventh gear wheel in engagement with the fourth gear wheel via an idler gear. The second output shaft comprises a fourth clutch arranged for selectively connecting one of the sixth gear wheel and the seventh gear wheel to the second output shaft and disconnecting the other of the sixth gear wheel and the seventh gear wheel from the second output shaft. With this configuration of the transmission, further alternative driving gears are enabled. When the sixth gear wheel is connected to the second output shaft, the seventh gear wheel is disconnected from the second output shaft. When the seventh gear wheel is connected to the second output shaft, the sixth gear wheel is disconnected from the second output shaft.

The disclosure further concerns a vehicle comprising a multi-speed transmission, as described above.

The disclosure further concerns a method for operating a multi-speed transmission for a vehicle. The transmission has an extension in an axial direction and comprises a first input shaft, a second input shaft, a first output shaft, a second output shaft, a first intermediate shaft and a second intermediate shaft. The transmission further comprises an annulus internally toothed first ring gear drivingly connected to the second input shaft and an annulus internally toothed second ring gear releasably connected to the first ring gear. The first intermediate shaft comprises a first gear wheel in engagement with the first ring gear and a second gear wheel in engagement with the second ring gear. The second intermediate shaft comprises a third gear wheel in engagement with the first ring gear and a fourth gear wheel in engagement with the second ring gear. The first output shaft comprises a fifth gear wheel in engagement with the second gear wheel, and the second output shaft comprises a sixth gear wheel in engagement with the fourth gear wheel. The first ring gear, the first gear wheel, and the third gear wheel are arranged in a first axial plane. The second ring gear, the second gear wheel, and the fifth gear wheel are arranged in a second axial plane. The second ring gear, the fourth gear wheel, and the sixth gear wheel are arranged in a third axial plane. The first ring gear and the second ring gear are releasably connected to each other via a first clutch, the first gear wheel and the second gear wheel are releasably connected to each other via a second clutch arranged on the first intermediate shaft, and the third gear wheel and the fourth gear wheel are releasably connected to each other via a third clutch arranged on the second intermediate shaft. The method comprises the steps: operating the first clutch, the second clutch, and the third clutch between connected and disconnected modes for providing different gear ratios of the multi-speed transmission.

Advantages with the method are that with the operation of the clutches a plurality of different gear ratios between torque input into the transmission and torque output from the transmission can be easily achieved. The multi-speed transmission is constructed with very few components, and a compact and efficient multi-speed transmission providing the different gear ratios is therefore achieved. The first intermediate shaft and the second intermediate shaft with the respective gear wheels are arranged inside the first ring gear and the second ring gear for enabling the compact layout of the transmission. The few components involved is providing a low volume construction that is simple in design, and the multi-speed transmission with these features are enabling reduced required space, weight, cost, and improved system efficiency. The clutches can be arranged in connected and disconnected states, and by selectively connecting or disconnecting the clutches torque transfer with different gear ratios is efficiently enabled. A control unit is used for selecting the connection or disconnection of the clutches, for delivering a correct gear ratio depending on driving conditions of the vehicle.

According to an embodiment, the method further comprises the steps: receiving a command for operating the transmission with a first gear ratio; transferring torque from the first input shaft directly to the first output shaft for providing the first gear ratio. The command is received from the control unit and is suitably based on the driving conditions of the vehicle.

According to an embodiment, the method further comprises the steps: receiving a command for operating the transmission with a second gear ratio or a seventh gear ratio; connecting the first clutch, disconnecting the second clutch, and disconnecting the third clutch; transferring torque from the second input shaft to the first output shaft via the first ring gear, the second ring gear, the second gear wheel, and the fifth gear wheel, for providing the second gear ratio, or transferring torque from the second input shaft to the second output shaft via the first ring gear, the second ring gear, the fourth gear wheel, and the sixth gear wheel, for providing the seventh gear ratio. The command is received from the control unit and is suitably based on the driving conditions of the vehicle.

According to an embodiment, the method further comprises the steps: receiving a command for operating the transmission with a third gear ratio or a fourth gear ratio;

disconnecting the first clutch, connecting the second clutch, and disconnecting the third clutch; and transferring torque from the second input shaft to the second output shaft via the first ring gear, the first gear wheel, the second gear wheel, the second ring gear, the fourth gear wheel, and the sixth gear wheel, for providing the third gear ratio, or transferring torque from the second input shaft to the first output shaft via the first ring gear, the first gear wheel, the second gear wheel, and the fifth gear wheel, for providing the fourth gear ratio. The command is received from the control unit and is suitably based on the driving conditions of the vehicle.

According to an embodiment, the method further comprises the steps: receiving a command for operating the transmission with a fifth gear ratio or a sixth gear ratio; disconnecting the first clutch, disconnecting the second clutch, and connecting the third clutch; and transferring torque from the second input shaft to the second output shaft via the first ring gear, the third gear wheel, the fourth gear wheel, and the sixth gear wheel, for providing the fifth gear ratio, or transferring torque from the second input shaft to the first output shaft via the first ring gear, the third gear wheel, the fourth gear wheel, the second ring gear, the second gear wheel, and the fifth gear wheel, for providing the sixth gear ratio. The command is received from the control unit and is suitably based on the driving conditions of the vehicle.

According to an embodiment, the method further comprises the steps: receiving a command for operating the transmission with an eighth gear ratio; disconnecting the first clutch, disconnecting the second clutch, and disconnecting the third clutch; transferring torque from the first input shaft to the second output shaft via the fifth gear wheel, the second gear wheel, the second ring gear, the fourth gear wheel, and the sixth gear wheel, for providing the eight gear ratio. Alternatively, the method further comprises the steps: receiving a command for operating the transmission with a ninth gear ratio; disconnecting the first clutch, connecting the second clutch, and connecting the third clutch; transferring torque from the first input shaft to the second output shaft via the fifth gear wheel, the second gear wheel, the first gear wheel, the first ring gear, the third gear wheel, the fourth gear wheel, and the sixth gear wheel, for providing the ninth gear ratio. The command is received from the control unit and is suitably based on the driving conditions of the vehicle.

BRIEF DESCRIPTION OF THE DRAWINGS

The disclosure will be described in detail in the following, with reference to the attached drawings, in which.

DETAILED DESCRIPTION OF EXAMPLE EMBODIMENTS

Various aspects of the disclosure will hereinafter be described in conjunction with the appended drawings to illustrate and not to limit the disclosure, wherein like designations denote like elements, and variations of the described aspects are not restricted to the specifically shown embodiments, but are applicable on other variations of the disclosure.

Those skilled in the art will appreciate that the steps, services and functions explained herein may be implemented using individual hardware circuitry, using software functioning in conjunction with a programmed microprocessor or general purpose computer, using one or more Application Specific Integrated Circuits (ASICs) and/or using one or more Digital Signal Processors (DSPs). It will also be appreciated that when the present disclosure is described in terms of a method, it may also be embodied in one or more processors and one or more memories coupled to the one or more processors, wherein the one or more memories store one or more programs that perform the steps, services and functions disclosed herein when executed by the one or more processors.

Figure 1:
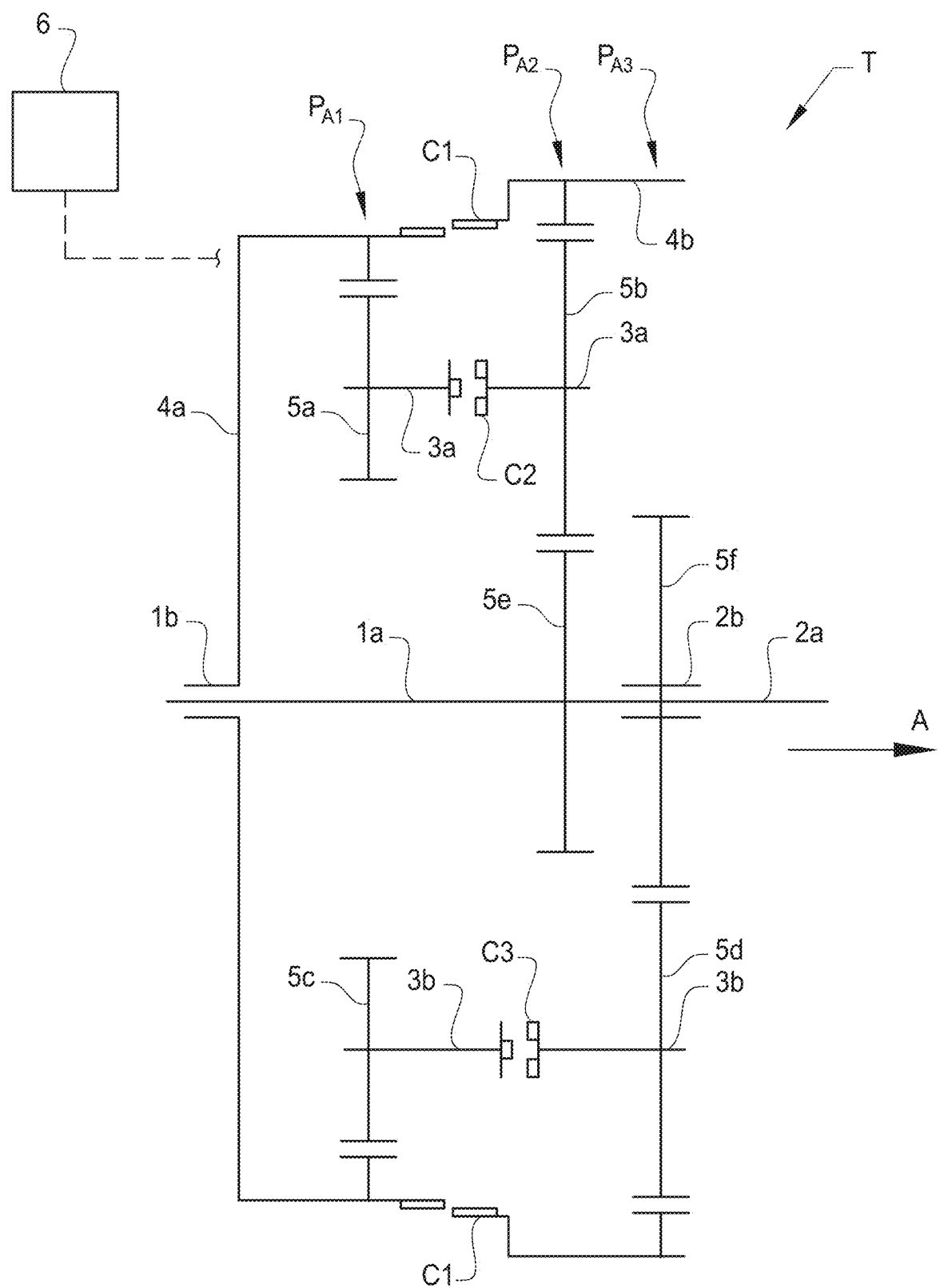
FIG. 1 shows schematically, a layout view of a multi-speed transmission according to the disclosure.

FIG. 1 schematically shows a multi-speed transmission T for a vehicle. The transmission T may form part of a vehicle powertrain system and is configured for providing different gear ratios. The transmission T is suitably arranged in the vehicle powertrain system between at least one power unit, and one or more driving wheels of the vehicle. The at least one power unit may for example be arranged as one or more electric motors, one or more internal combustion engines, or combinations of electric motors and internal combustion engines. The transmission T may be arranged within the vehicle in any suitable position for efficient power transfer between the at least one power unit and the one or more driving wheels.

As shown in FIG. 1, the multi-speed transmission T has an extension in an axial direction A and comprises a first input shaft $1a$ and a second input shaft $1b$. The respective input shafts are drivingly connected to the at least one power unit for providing a driving torque to the transmission T. The first input shaft $1a$ and the second input shaft $1b$ are concentrically arranged in relation to each other, and as shown in the figure, the first input shaft $1a$ is arranged as an inner shaft and the second input shaft $1b$ as an outer shaft concentrically outside the first input shaft $1a$. The first input shaft $1a$ and the second input shaft $1b$ are arranged to rotate independently of each other and a dual clutch or similar arrangement of the powertrain system connected to the input shafts may be used for transferring torque from the at least one power unit to one of the first input shaft $1a$ and the second input shaft $1b$.

As shown in FIG. 1, the transmission T comprises a first output shaft $2a$ and a second output shaft $2b$. The respective output shafts are drivingly connected to the one or more driving wheels for providing a driving torque from the transmission T. The first output shaft $2a$ and the second output shaft $2b$ are concentrically arranged in relation to each other, and as shown in the figure, the first output shaft $2a$ is arranged as an inner shaft and the second output shaft $2b$ as an outer shaft concentrically outside the first output shaft $2a$. Each of the first output shaft $2a$ and the second output shaft $2b$ is arranged for transferring torque to the one or more driving wheels of the vehicle, and any suitable connection between the respective output shafts and the one or more driving wheels may be used.

As shown in FIG. 1, the transmission T further comprises a first intermediate shaft $3a$ and a second intermediate shaft $3b$. The first input shaft $1a$, the second input shaft $1b$, the first output shaft $2a$, the second output shaft $2b$, the first intermediate shaft $3a$ and the second intermediate shaft $3b$, are arranged in a parallel relationship to each other in the axial direction A of the transmission T. The first input shaft $1a$ and the first output shaft $2a$ are connected to each other and formed as a common shaft structure extending in the axial direction A.

The transmission T further comprises an annulus internally toothed first ring gear $4a$ drivingly connected to the second input shaft $1b$ and an annulus internally toothed second ring gear $4b$ releasably connected to the first ring gear $4a$, as illustrated in FIG. 1. The first ring gear $4a$ and the second ring gear $4b$ are concentrically arranged in relation to each other and separated in the axial direction A. The first ring gear $4a$ and the second ring gear $4b$ are releasably connected to each other via a first clutch C1. The first clutch C1 may be of any suitable type that is selectively operated, allowing the ring gears to either be connected to each other or disconnected from each other depending on the state of the first clutch C1, such as for example a multi-disc clutch for a compact transmission design. Due to the relatively large diameters of the first ring gear $4a$ and the second ring gear $4b$, the first clutch C1 may be arranged as a dry clutch. Alternatively, the first clutch C1 is arranged as a wet clutch.

When the first ring gear $4a$ and the second ring gear $4b$ are connected to each other by the first clutch C1, they are rotating as a common unit with the same rotational speed. When the first ring gear $4a$ and the second ring gear $4b$ are disconnected from each other, they are free to rotate relative to each other. When disconnected, the ring gears may rotate with the same rotational speed or with different rotational speeds, and further, one of the ring gears may be rotating and the other may be non-rotating, depending on the design and construction of the transmission T. As shown in the embodiment illustrated in the figures, the second ring gear $4b$ has a larger diameter that the first ring gear $4a$. It should however be understood that the ring gears may have other configurations or sizes, such as for example the same diameter, or the first ring gear may instead have a larger diameter.

As shown in FIGS. 1 and 2A-2C, the first intermediate shaft $3a$ and the second intermediate shaft $3b$ are arranged inside the first ring gear $4a$ and the second ring gear $4b$ for a compact layout of the transmission T. The first intermediate shaft $3a$ comprises a first gear wheel $5a$ in engagement with the first ring gear $4a$ and a second gear wheel $5b$ in engagement with the second ring gear $4b$. The first gear wheel $5a$ and the second gear wheel $5b$ are arranged as externally toothed gears for engagement with the respective internally toothed ring gears. The second intermediate shaft $3b$ comprises a third gear wheel $5c$ in engagement with the first ring gear $4a$ and a fourth gear wheel $5d$ in engagement with the second ring gear $4b$. The third gear wheel $5c$ and the fourth gear wheel $5d$ are arranged as externally toothed gears for engagement with the respective internally toothed ring gears. The first output shaft $2a$ comprises a fifth gear wheel $5e$ in engagement with the second gear wheel $5b$, and the second output shaft $2b$ comprises a sixth gear wheel $5f$ in engagement with the fourth gear wheel $5d$. The fifth gear wheel $5e$ is arranged as an externally toothed gear for engagement with the second gear wheel $5b$, and the sixth gear wheel $5f$ is arranged as an externally toothed gear for engagement with the fourth gear wheel $5d$. The ring gears and the gear wheels may have any suitable toothed configuration for secure interaction and torque transfer. As shown in the figures, the first gear wheel $5a$ and the third gear wheel $5c$ are arranged on radially opposite sides of the first input gear shaft $1a$ and the first output gear shaft $2a$, and the second gear wheel $5b$ and the fourth gear wheel $5d$ are arranged on radially opposite sides of the first input gear shaft $1a$ and the first output gear shaft $2a$. In the figures, one example embodiment of the multi-speed transmission is exemplified. It should be understood that the ring gears and the gear wheels could have other configurations or sizes, such as for example other relationships between diameters.

Figure 2A:
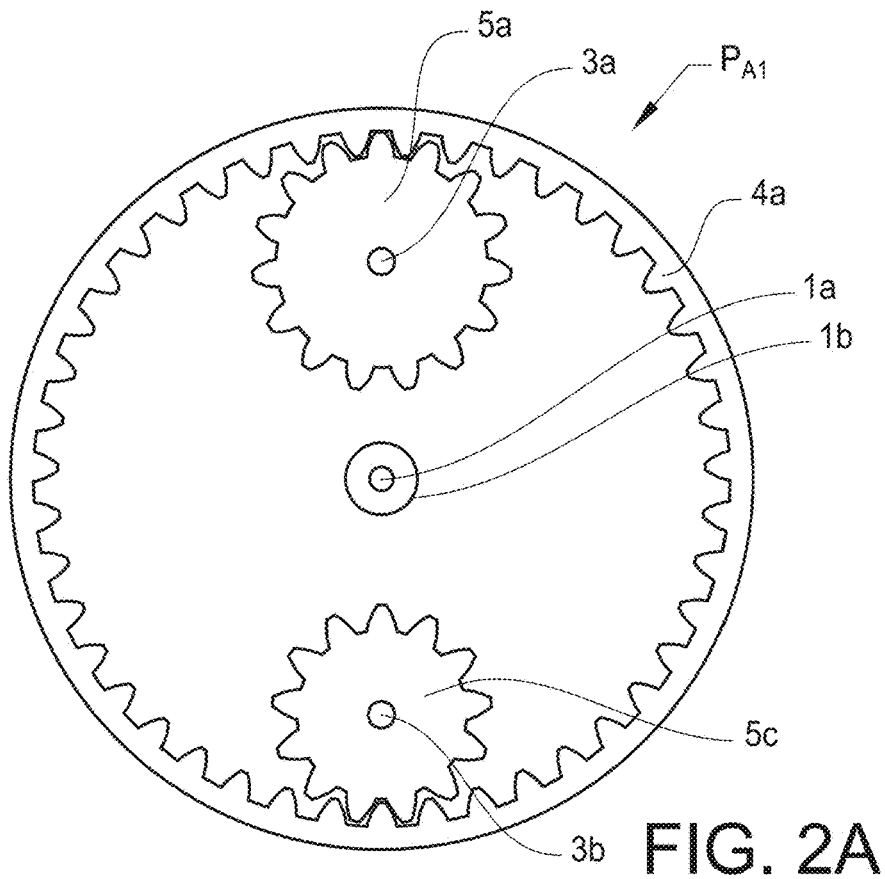
FIG. 2A shows schematically, in a side view a first axial plane of the multi-speed transmission according to the disclosure.
Figure 2B:
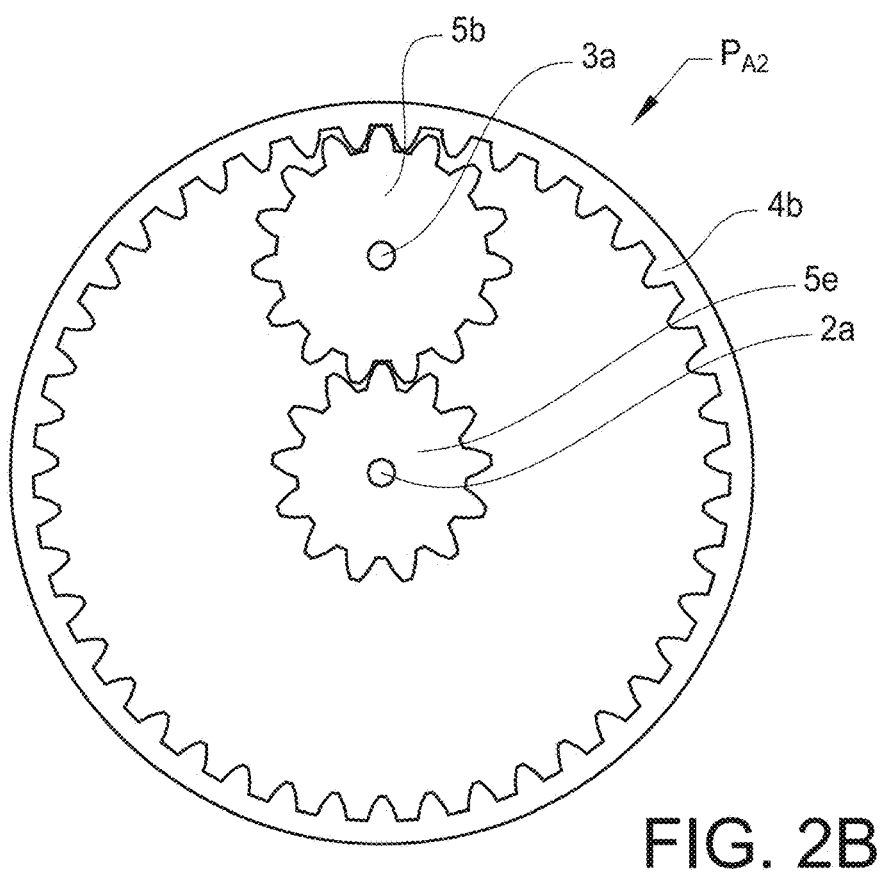
FIG. 2B shows schematically, in a side view a second axial plane of the multi-speed transmission according to the disclosure.
Figure 2C:
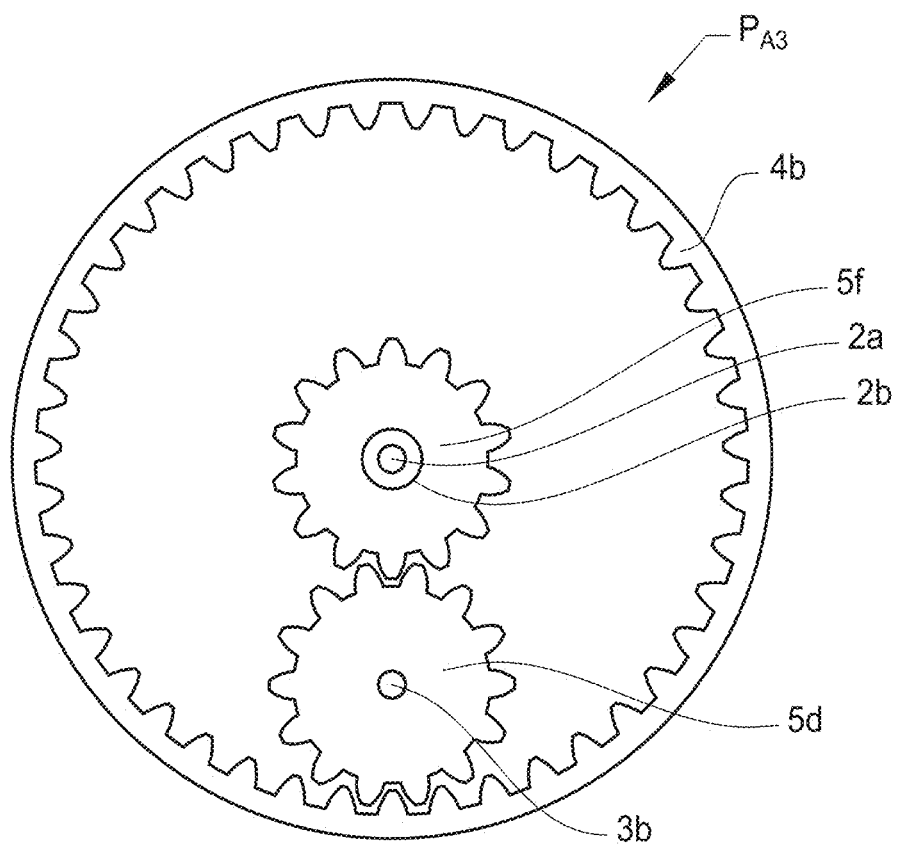
FIG. 2C shows schematically, in a side view a third axial plane of the multi-speed transmission according to the disclosure.

As shown in FIGS. 1 and 2A, the first ring gear $4a$, the first gear wheel $5a$, and the third gear wheel $5c$ are arranged in a first axial plane $P_{A1}$. As shown in FIGS. 1 and 2B, the second ring gear $4b$, the second gear wheel $5b$, and the fifth gear wheel $5e$ are arranged in a second axial plane $P_{A2}$. As shown in FIGS. 1 and 2C, the second ring gear $4b$, the fourth gear wheel $5d$, and the sixth gear wheel $5f$ are arranged in a third axial plane $P_{A3}$. As understood from FIG. 1, the first axial plane $P_{A1}$, the second axial plane $P_{A2}$, and the third axial plane $P_{A3}$, are spaced apart from each other in the axial direction A. The second axial plane $P_{A2}$ is arranged between the first axial plane $P_{A1}$ and the third axial plane $P_{A3}$. The first axial plane $P_{A1}$, the second axial plane $P_{A2}$, and the third axial plane $P_{A3}$, are arranged in a parallel relationship to each other and separated in the axial direction A of the transmission T.

As illustrated in FIG. 1, the first intermediate shaft $3a$ comprises a second clutch C2. The second clutch C2 is arranged between the first gear wheel $5a$ and the second gear wheel $5b$. In this way, the first gear wheel $5a$ and the second gear wheel $5b$ may be selectively connected to each other or disconnected from each other depending on the state of the second clutch C2. Thus, the first gear wheel $5a$ and the second gear wheel 5b are releasably connected to each other via the second clutch C2. The second clutch C2 may be of any suitable design, such as for example a dog clutch, a friction clutch, or a synchronizer clutch assembly. When the second clutch C2 is connected, the first gear wheel 5a and the second gear wheel 5b are rotating in the same rotational direction with the same rotational speed. When the second clutch C2 is disconnected, the first gear wheel 5a and the second gear wheel 5b are disconnected from each other and they are free to rotate relative to each other. When disconnected, the gear wheels may rotate with the same rotational speed or with different rotational speeds, and further, one of the gear wheels may be rotating and the other may be non-rotating.

As illustrated in FIG. 1, the second intermediate shaft 3b comprises a third clutch C3. The third clutch C3 is arranged between the third gear wheel 5c and the fourth gear wheel 5d. In this way, the third gear wheel 5c and the fourth gear wheel 5d may be selectively connected to each other or disconnected from each other depending on the state of the third clutch C3. Thus, the third gear wheel 5c and the fourth gear wheel 5d are releasably connected to each other via the third clutch C3. The third clutch C3 may be of any suitable design, such as for example a dog clutch, a friction clutch, or a synchronizer clutch assembly. When the third clutch C3 is connected, the third gear wheel 5c and the fourth gear wheel 5d are rotating in the same rotational direction with the same rotational speed. When the third clutch C3 is disconnected, the third gear wheel 5c and the fourth gear wheel 5d are disconnected from each other and they are free to rotate relative to each other. When disconnected, the gear wheels may rotate with the same rotational speed or with different rotational speeds, and further, one of the gear wheels may be rotating and the other may be non-rotating.

The multi-speed transmission T may further comprise non-illustrated shafts, bearing structures, housing structures and other components, for enabling the functionality of the transmission.

The multi-speed transmission T suitably comprises a control unit 6 for controlling the operation of the transmission system, as schematically indicated in for example FIG. 1. The control unit may control actuators or other components needed for enabling the different operational modes of the transmission T via the clutches. By operating the first clutch C1, the second clutch C2, and the third clutch C3, between connected and disconnected modes different gear ratios of the multi-speed transmission T are provided, as will be further described below. The control unit is thus used for selecting the connection or disconnection of the respective clutches, for delivering a correct gear ratio depending on driving conditions of the vehicle.

The transmission layout illustrated in FIG. 1 will be described below in connection to FIGS. 3A-3I for different operational steps.

Figure 3A:
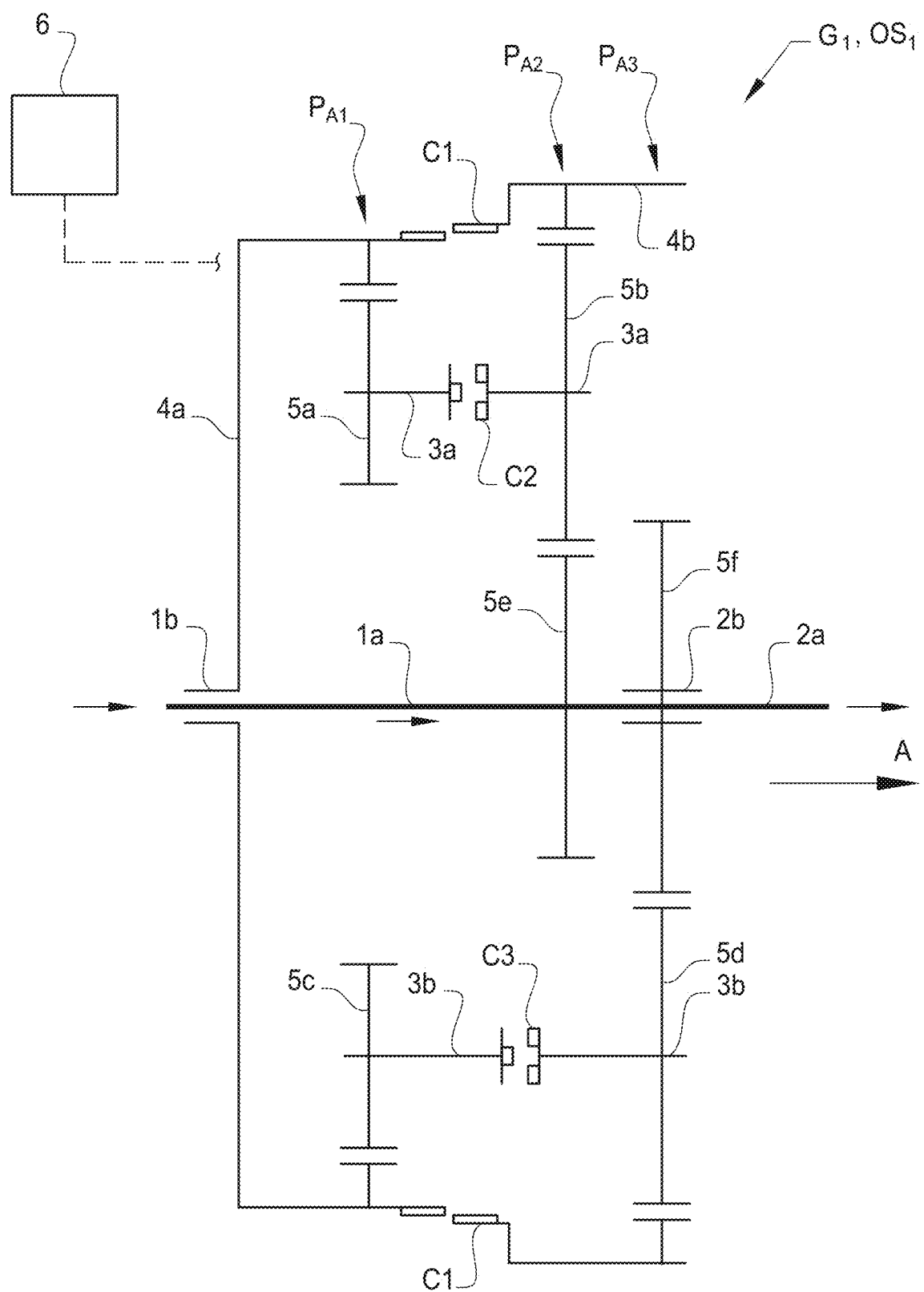
FIG. 3A shows schematically, a layout view of the multi-speed transmission in an operational step providing a first gear ratio according to the disclosure.

In FIG. 3A, a layout view of the multi-speed transmission T in a first operational step $OS_1$ providing a first gear ratio $G_1$ is schematically illustrated. In order to operate the transmission T in the first operational step $OS_1$, a command may be received from the control unit 6 for operating the transmission T with the first gear ratio $G_1$, by: transferring torque from the first input shaft 1a directly to the first output shaft 2a for providing the first gear ratio $G_1$. The torque transfer path is illustrated with arrows in the figure. In this operational step, the first clutch C1, the second clutch C2, and the third clutch C3, may be arranged in any suitable state, since no torque transfer is taking place via the clutches. This operational step is providing a driving gear, where the rotational direction of the output shaft is the same as the rotational direction of the input shaft.

Figure 3B:
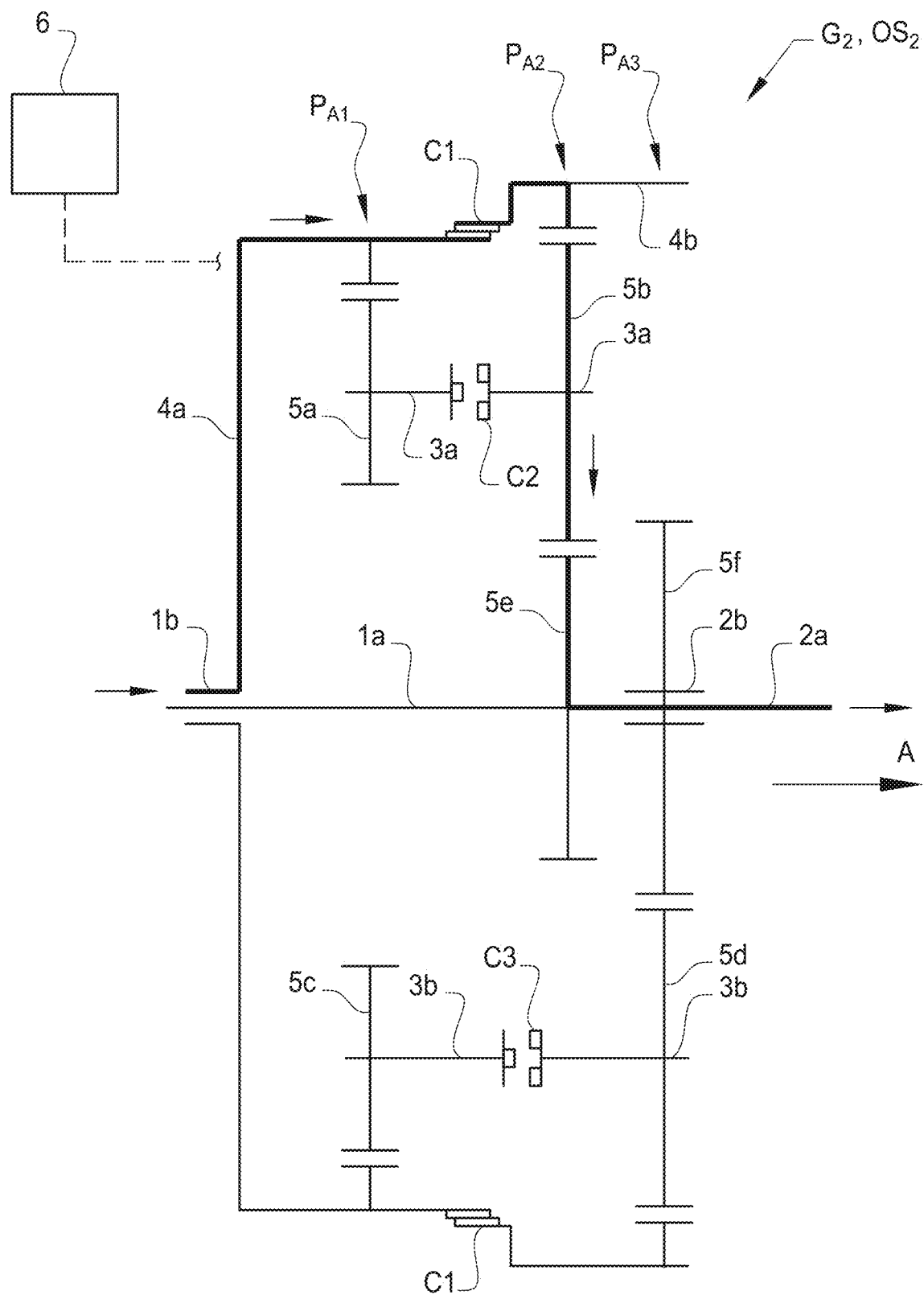
FIG. 3B shows schematically, a layout view of the multi-speed transmission in an operational step providing a second gear ratio according to the disclosure.

In FIG. 3B, a layout view of the multi-speed transmission T in a second operational step $OS_2$ providing a second gear ratio $G_2$ is schematically illustrated. In order to operate the transmission T in the second operational step $OS_2$, a command may be received from the control unit 6 for operating the transmission T with the second gear ratio $G_2$, by: connecting the first clutch C1, disconnecting the second clutch C2, and disconnecting the third clutch C3; transferring torque from the second input shaft 1b to the first output shaft 2a via the first ring gear 4a, the second ring gear 4b, the second gear wheel 5b, and the fifth gear wheel 5e, for providing the second gear ratio $G_2$. The torque transfer path is illustrated with arrows in the figure. This operational step is providing a driving gear, where the rotational direction of the output shaft is opposite the rotational direction of the input shaft.

Figure 3C:
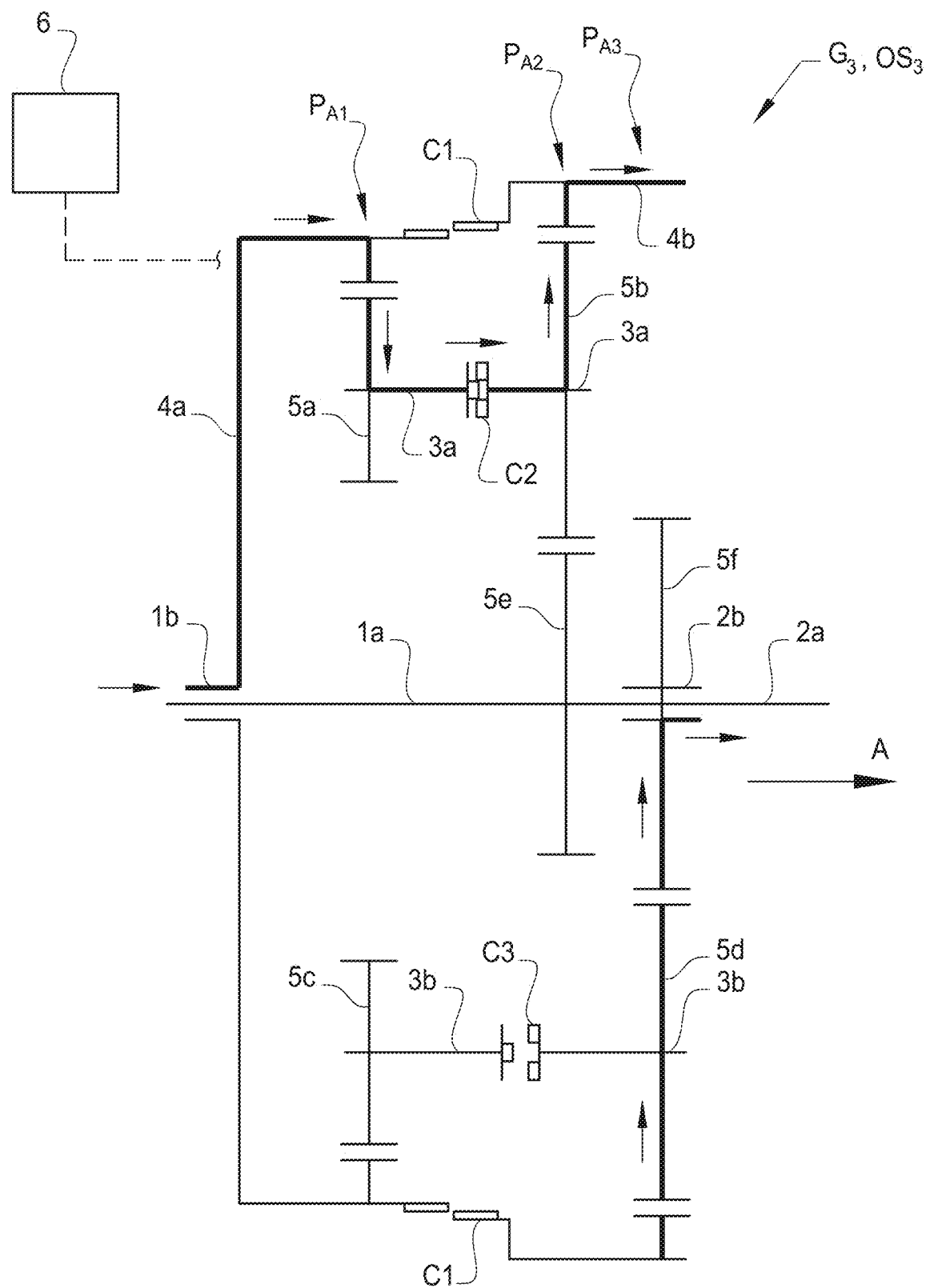
FIG. 3C shows schematically, a layout view of the multi-speed transmission in an operational step providing a third gear ratio according to the disclosure.

In FIG. 3C, a layout view of the multi-speed transmission T in a third operational step $OS_3$ providing a third gear ratio $G_3$ is schematically illustrated. In order to operate the transmission T in the third operational step $OS_3$, a command may be received from the control unit 6 for operating the transmission T with the third gear ratio $G_3$, by: disconnecting the first clutch C1, connecting the second clutch C2, and disconnecting the third clutch C3; transferring torque from the second input shaft 1b to the second output shaft 2b via the first ring gear 4a, the first gear wheel 5a, the second gear wheel 5b, the second ring gear 4b, the fourth gear wheel 5d, and the sixth gear wheel 5f, for providing the third gear ratio $G_3$. The torque transfer path is illustrated with arrows in the figure. This operational step is providing a driving gear, where the rotational direction of the output shaft is opposite the rotational direction of the input shaft.

Figure 3D:
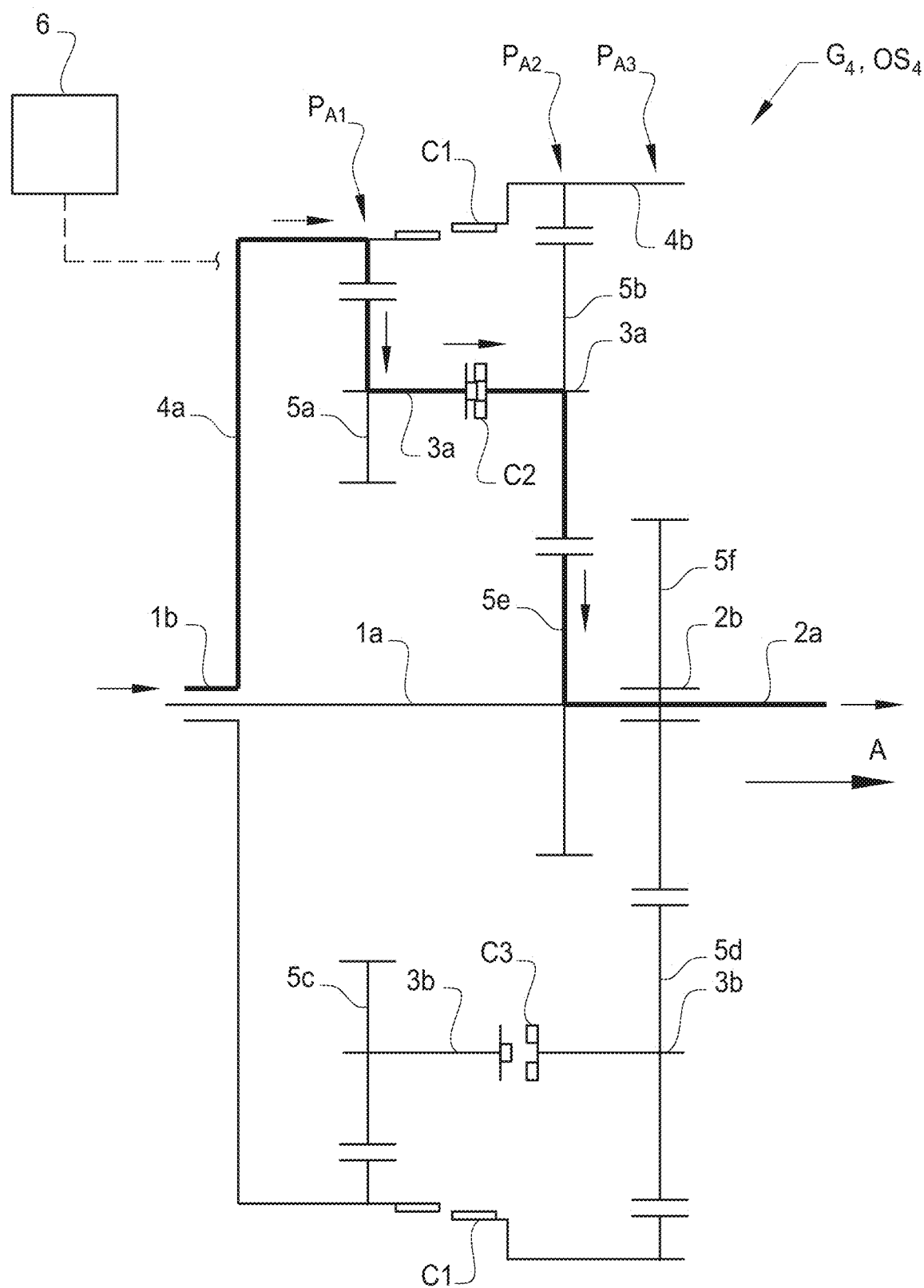
FIG. 3D shows schematically, a layout view of the multi-speed transmission in an operational step providing a fourth gear ratio according to the disclosure.

In FIG. 3D, a layout view of the multi-speed transmission T in a fourth operational step $OS_4$ providing a fourth gear ratio $G_4$ is schematically illustrated. In order to operate the transmission T in the fourth operational step $OS_4$, a command may be received from the control unit 6 for operating the transmission T with the fourth gear ratio $G_4$, by: disconnecting the first clutch C1, connecting the second clutch C2, and disconnecting the third clutch C3; transferring torque from the second input shaft 1b to the first output shaft 2a via the first ring gear 4a, the first gear wheel 5a, the second gear wheel 5b, and the fifth gear wheel 5e for providing the fourth gear ratio $G_4$. The torque transfer path is illustrated with arrows in the figure. This operational step is providing a driving gear, where the rotational direction of the output shaft is opposite the rotational direction of the input shaft.

Figure 3E:
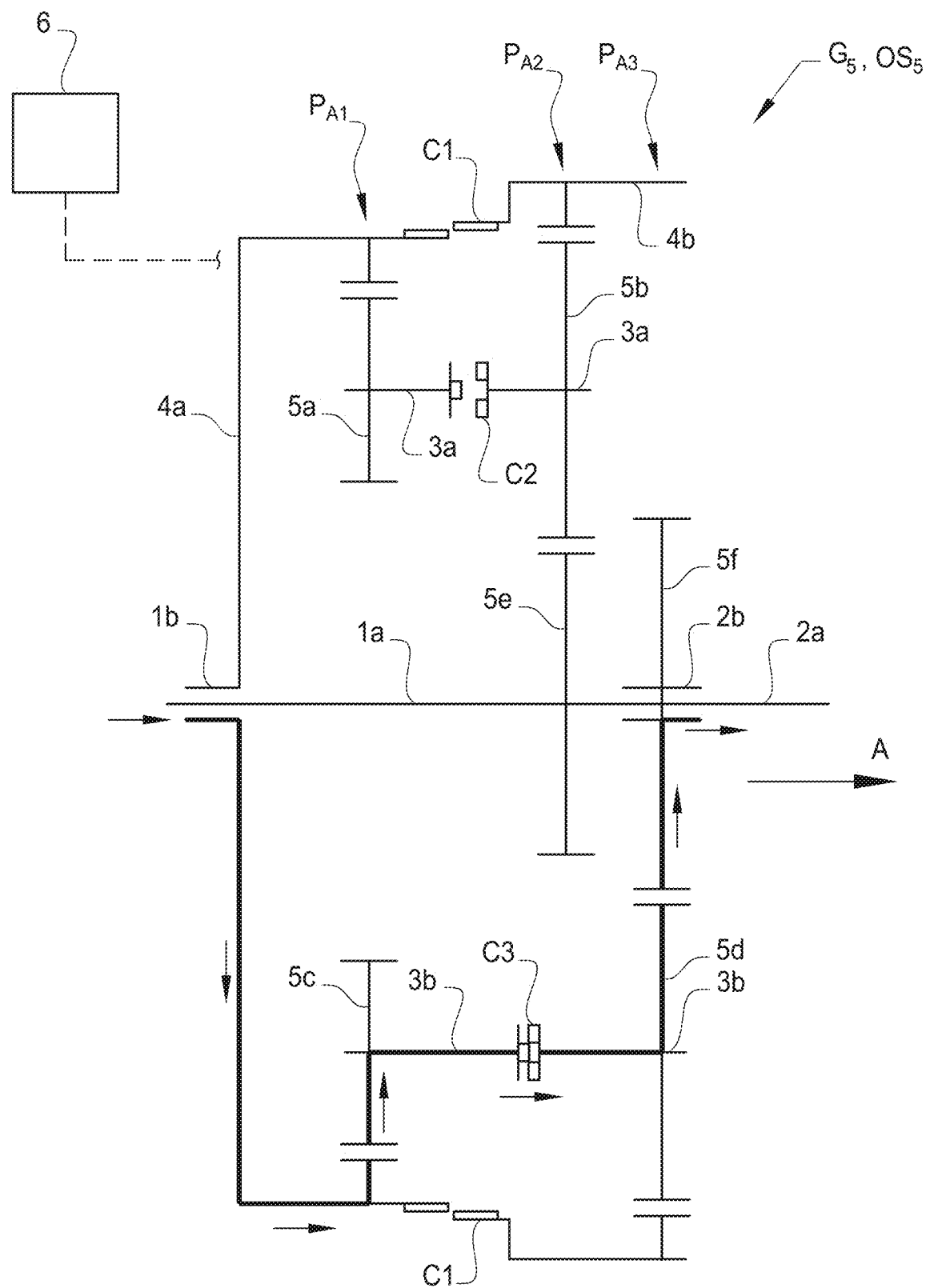
FIG. 3E shows schematically, a layout view of the multi-speed transmission in an operational step providing a fifth gear ratio according to the disclosure.

In FIG. 3E, a layout view of the multi-speed transmission T in a fifth operational step $OS_5$ providing a fifth gear ratio $G_5$ is schematically illustrated. In order to operate the transmission T in the fifth operational step $OS_5$, a command may be received from the control unit 6 for operating the transmission T with the fifth gear ratio $G_5$, by: disconnecting the first clutch C1, disconnecting the second clutch C2, and connecting the third clutch C3; transferring torque from the second input shaft 1b to the second output shaft 2b via the first ring gear 4a, the third gear wheel 5c, the fourth gear wheel 5d, and the sixth gear wheel 5f, for providing the fifth gear ratio $G_5$. The torque transfer path is illustrated with arrows in the figure. This operational step is providing a driving gear, where the rotational direction of the output shaft is opposite the rotational direction of the input shaft.

Figure 3F:
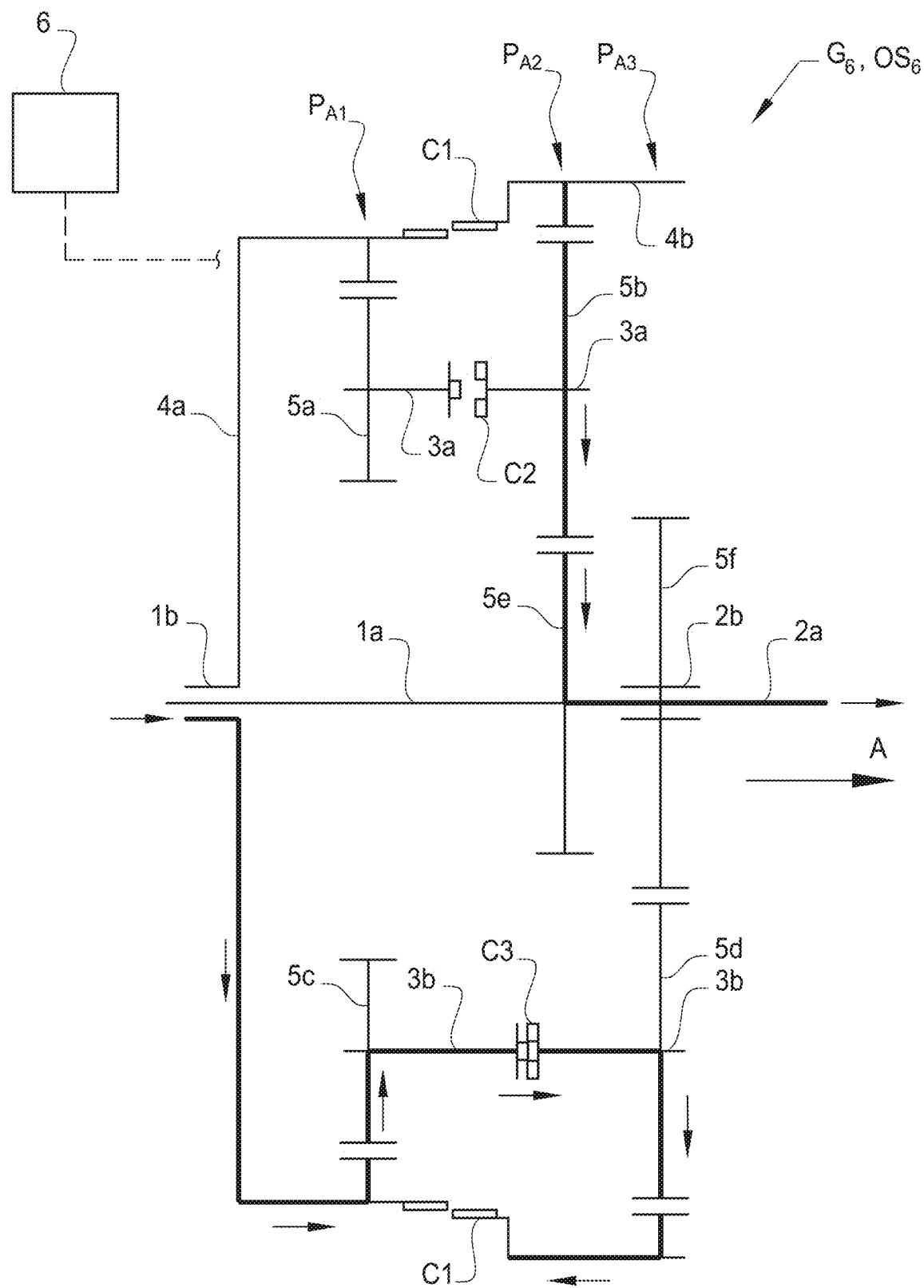
FIG. 3F shows schematically, a layout view of the multi-speed transmission in an operational step providing a sixth gear ratio according to the disclosure.

In FIG. 3F, a layout view of the multi-speed transmission T in a sixth operational step $OS_6$ providing a sixth gear ratio $G_6$ is schematically illustrated. In order to operate the transmission T in the sixth operational step $OS_6$, a command may be received from the control unit 6 for operating the transmission T with the sixth gear ratio $G_6$, by: disconnecting the first clutch C1, disconnecting the second clutch C2, and connecting the third clutch C3; and transferring torque from the second input shaft 1b to the first output shaft 2a via the first ring gear 4a, the third gear wheel 5c, the fourth gear wheel 5d, the second ring gear 4b, the second gear wheel 5b, and the fifth gear wheel 5e, for providing the sixth gear ratio $G_6$. The torque transfer path is illustrated with arrows in the figure. This operational step is providing a driving gear, where the rotational direction of the output shaft is opposite the rotational direction of the input shaft.

Figure 3G:
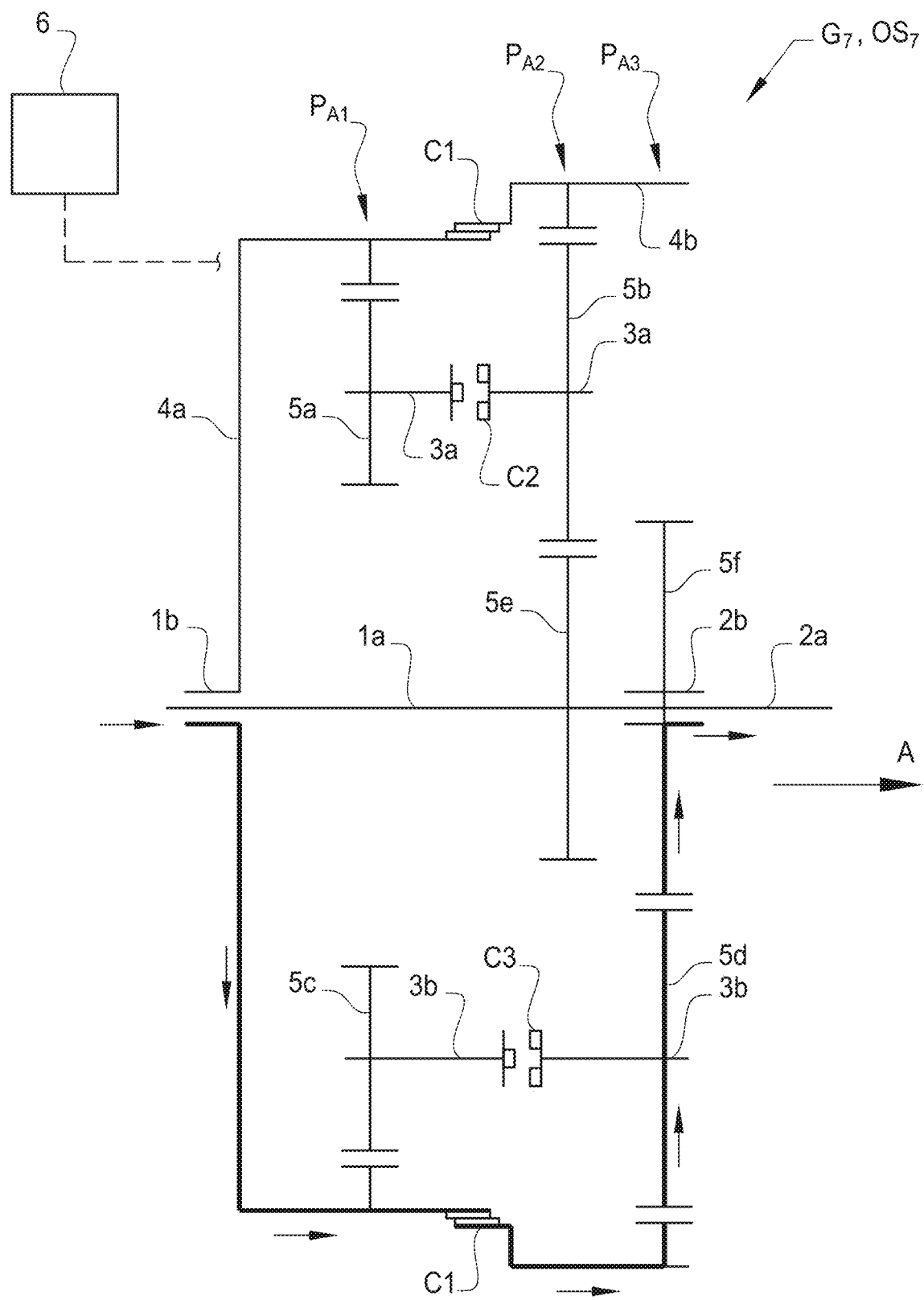
FIG. 3G shows schematically, a layout view of the multi-speed transmission in an operational step providing a seventh gear ratio according to the disclosure.

In FIG. 3G, a layout view of the multi-speed transmission T in a seventh operational step $OS_7$ providing a seventh gear ratio $G_7$ is schematically illustrated. In order to operate the transmission T in the seventh operational step $OS_7$, a command may be received from the control unit 6 for operating the transmission T with the seventh gear ratio $G_7$, by: connecting the first clutch C1, disconnecting the second clutch C2, and disconnecting the third clutch C3; and transferring torque from the second input shaft 1b to the second output shaft 2b via the first ring gear 4a, the second ring gear 4b, the fourth gear wheel 5d, and the sixth gear wheel 5f, for providing the seventh gear ratio $G_7$. The torque transfer path is illustrated with arrows in the figure. This operational step is providing a driving gear, where the rotational direction of the output shaft is opposite the rotational direction of the input shaft.

Figure 3H:
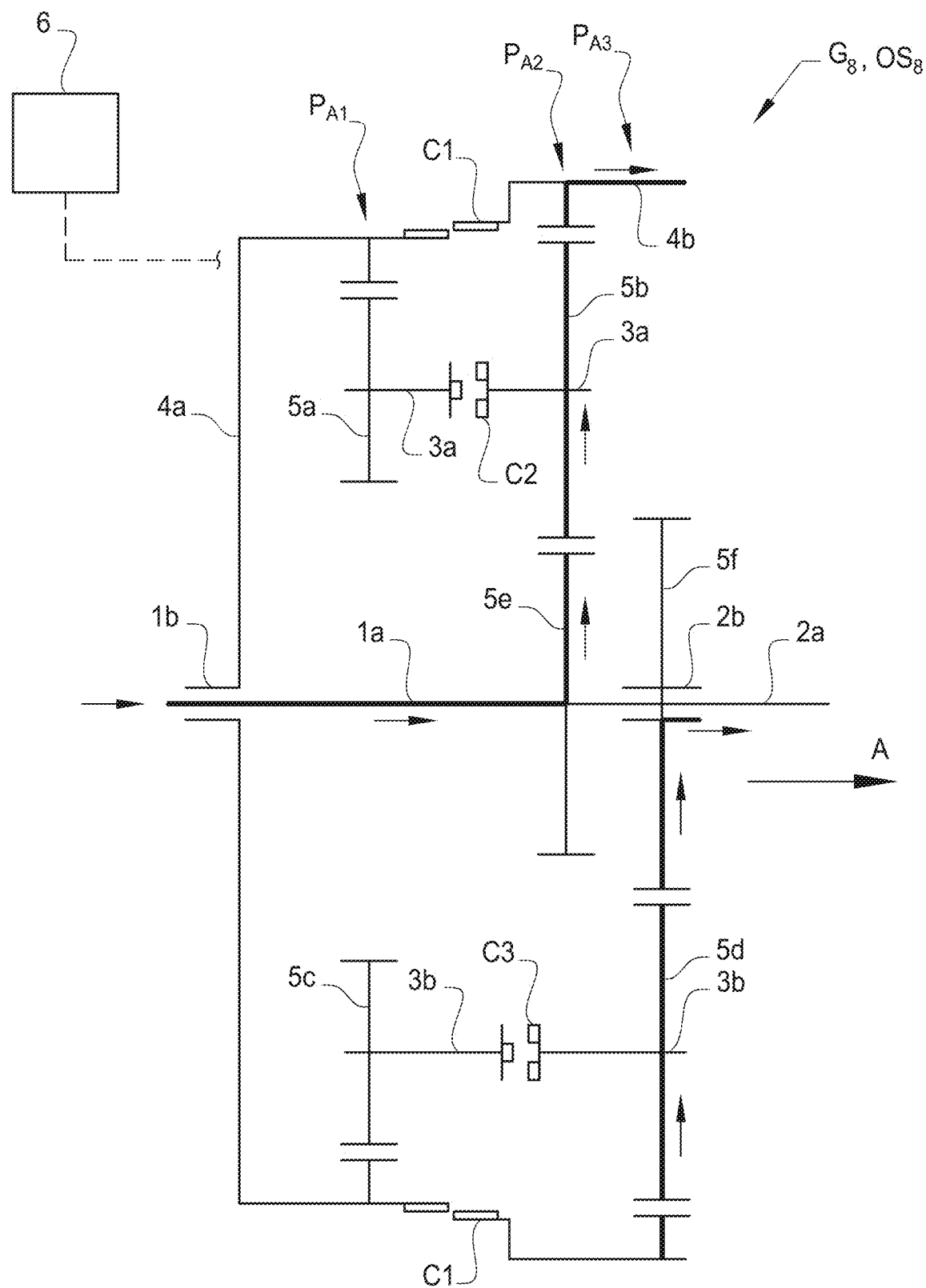
FIG. 3H shows schematically, a layout view of the multi-speed transmission in an operational step providing an eight gear ratio according to the disclosure.

In FIG. 3H, a layout view of the multi-speed transmission T in an eight operational step $OS_8$ providing an eight gear ratio $G_8$ is schematically illustrated. In order to operate the transmission T in the eight operational step $OS_8$, a command may be received from the control unit 6 for operating the transmission T with the eight gear ratio $G_8$, by: disconnecting the first clutch C1, disconnecting the second clutch C2, and disconnecting the third clutch C3; and transferring torque from the first input shaft 1a to the second output shaft 2b via the fifth gear wheel 5e, the second gear wheel 5b, the second ring gear 4b, the fourth gear wheel 5d, and the sixth gear wheel 5f, for providing the eight gear ratio $G_8$. The torque transfer path is illustrated with arrows in the figure. This operational step is providing a driving gear, where the rotational direction of the output shaft is the same as the rotational direction of the input shaft.

Figure 3I:
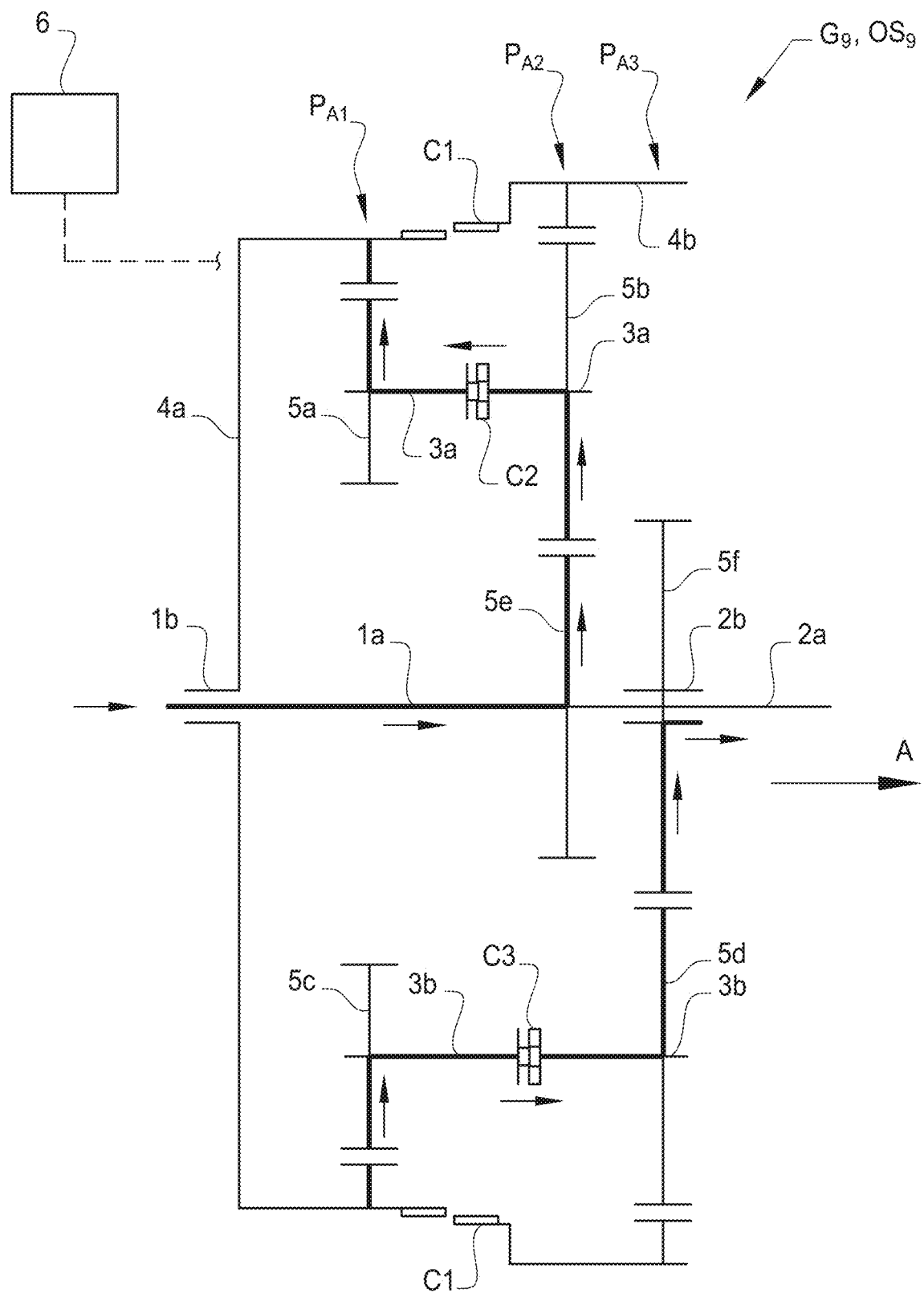
FIG. 3I shows schematically, a layout view of the multi-speed transmission in an operational step providing a ninth gear ratio according to the disclosure.

In FIG. 3I, a layout view of the multi-speed transmission T in a ninth operational step $OS_9$ providing a ninth gear ratio $G_9$ is schematically illustrated. In order to operate the transmission T in the ninth operational step $OS_9$, a command may be received from the control unit 6 for operating the transmission T with the ninth gear ratio $G_9$, by: disconnecting the first clutch C1, connecting the second clutch C2, and connecting the third clutch C3; and transferring torque from the first input shaft 1a to the second output shaft 2b via the fifth gear wheel 5e, the second gear wheel 5b, the first gear wheel 5a, the first ring gear 4a, the third gear wheel 5c, the fourth gear wheel 5d, and the sixth gear wheel 5f, for providing the ninth gear ratio $G_9$. The torque transfer path is illustrated with arrows in the figure. This operational step is providing a driving gear, where the rotational direction of the output shaft is the same as the rotational direction of the input shaft.

Figure 4:
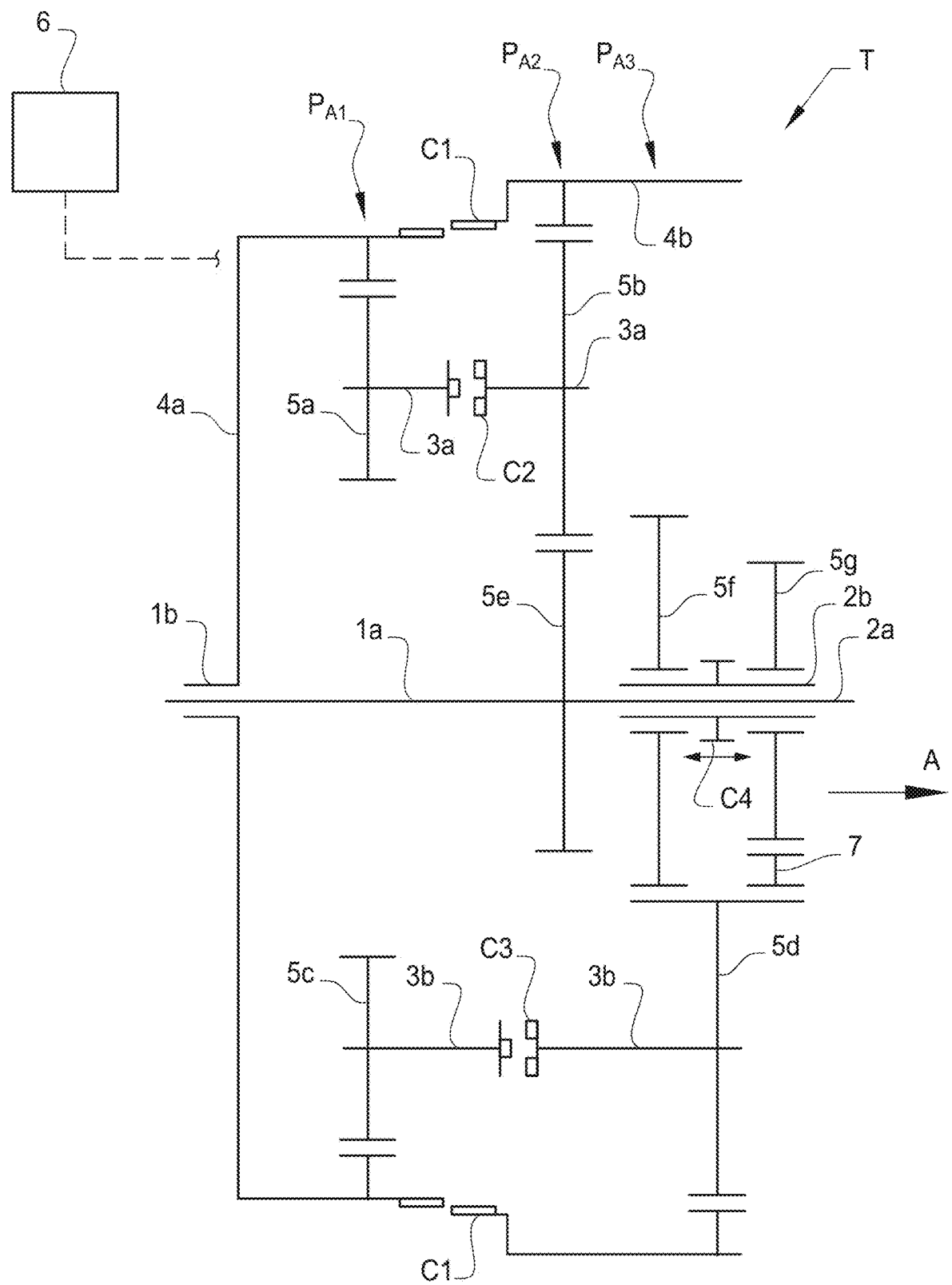
FIG. 4 shows schematically, a layout view of a multi-speed transmission in an alternative embodiment according to the disclosure.

An alternative embodiment of the multi-speed transmission is illustrated in FIG. 4. In this embodiment, the second output shaft 2b of the multi speed transmission T is comprising the sixth gear wheel 5f and further a seventh gear wheel 5g. As understood from the figure, the sixth gear wheel 5f is drivingly engaging the fourth gear wheel 5d in the same way as in the embodiments described above, and the seventh gear wheel 5g is drivingly engaging the fourth gear wheel 5d via an idler gear 7. The idler gear 7 is thus arranged between the fourth gear wheel 5d and the seventh gear wheel 5h.

In the embodiment illustrated in FIG. 4, the sixth gear wheel 5f and the seventh gear wheel 5g are connected to the second output shaft 2b via a fourth clutch C4, where the fourth clutch C4 is selectively connecting the sixth gear wheel 5f or the seventh gear wheel 5g to the second output shaft 2b. When the fourth clutch C4 is connecting the sixth gear wheel 5f to the second output shaft 2b, the seventh gear wheel 5g is disconnected from the second output shaft 2b. In this way, the seventh gear wheel 5g is free to rotate about second output shaft 2b when the sixth gear wheel 5f is connected to the second output shaft 2b. When the fourth clutch C4 is connecting the sixth gear wheel 5f to the second output shaft 2b, the second ring gear 4b, the fourth gear wheel 5d, and the sixth gear wheel 5f are forming the third axial plane $P_{A3}$. When the fourth clutch C4 is connecting the seventh gear wheel 5g to the second output shaft 2b, the sixth gear wheel 5f is disconnected from the second output shaft 2b. In this way, the sixth gear wheel 5f is free to rotate about second output shaft 2b when the seventh gear wheel 5g is connected to the second output shaft 2b. When the fourth clutch C4 is connecting the seventh gear wheel 5g to the second output shaft 2b, the second ring gear 4b, the fourth gear wheel 5d, the idler gear 7, and the seventh gear wheel 5g are forming the third axial plane $P_{A3}$. The sixth gear wheel 5f and the seventh gear wheel 5g are connected to the second driving shaft with suitable bearings and a suitable clutch arrangement forming the fourth clutch C4, such as a synchronizing clutch configured for slidingly connect one of the gear wheels to the second output shaft 2b, or other similar clutch arrangement.

The transmission layout illustrated in FIG. 4 will be described below in connection to FIGS. 5A-5B for different operational steps.

Figure 5A:
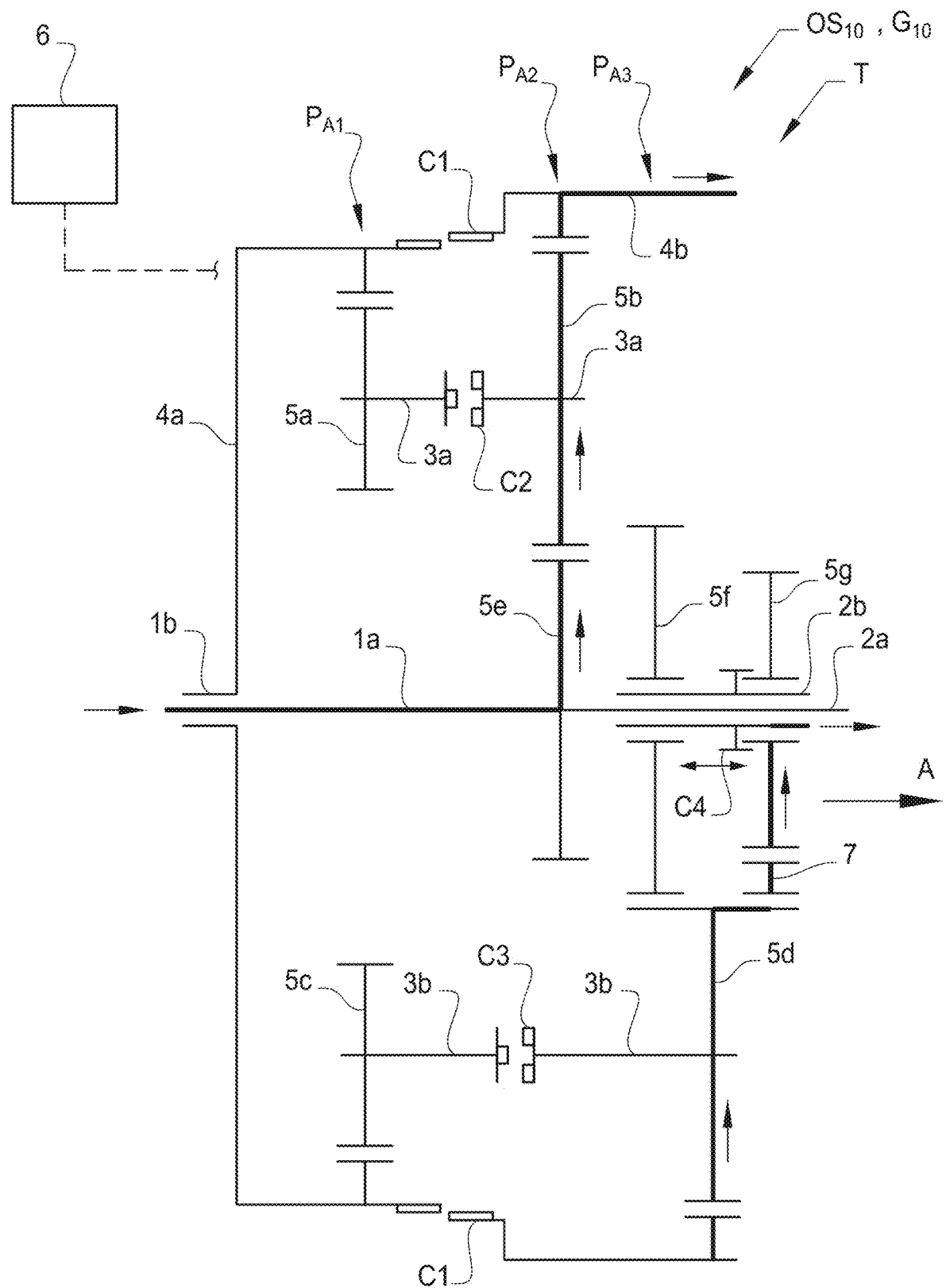
FIG. 5A shows schematically, a layout view of the multi-speed transmission of the alternative embodiment in an operational step providing a tenth gear ratio according to the disclosure.

In FIG. 5A, a layout view of the multi-speed transmission T in a tenth operational step $OS_{10}$ providing a tenth gear ratio $G_{10}$ is schematically illustrated. In order to operate the transmission T in the tenth operational step $OS_{10}$, a command may be received from the control unit 6 for operating the transmission T with the tenth gear ratio $G_{10}$, by: disconnecting the first clutch C1, disconnecting the second clutch C2, disconnecting the third clutch C3, and connecting the seventh gear wheel 5g to the second output shaft 2b with the fourth clutch C4; and transferring torque from the first input shaft 1a to the second output shaft 2b via the fifth gear wheel 5e, the second gear wheel 5b, the second ring gear 4b, the fourth gear wheel 5d, the idler gear 7, and the seventh gear wheel 5g, for providing the tenth gear ratio $G_{10}$. The torque transfer path is illustrated with arrows in the figure. This operational step is providing a driving gear, where the rotational direction of the output shaft is opposite the rotational direction of the input shaft. If instead connecting the sixth gear wheel 5f to the second output shaft 2b with the fourth clutch C4, the transmission T is operated in the same way as illustrated in FIG. 3H.

Figure 5B:
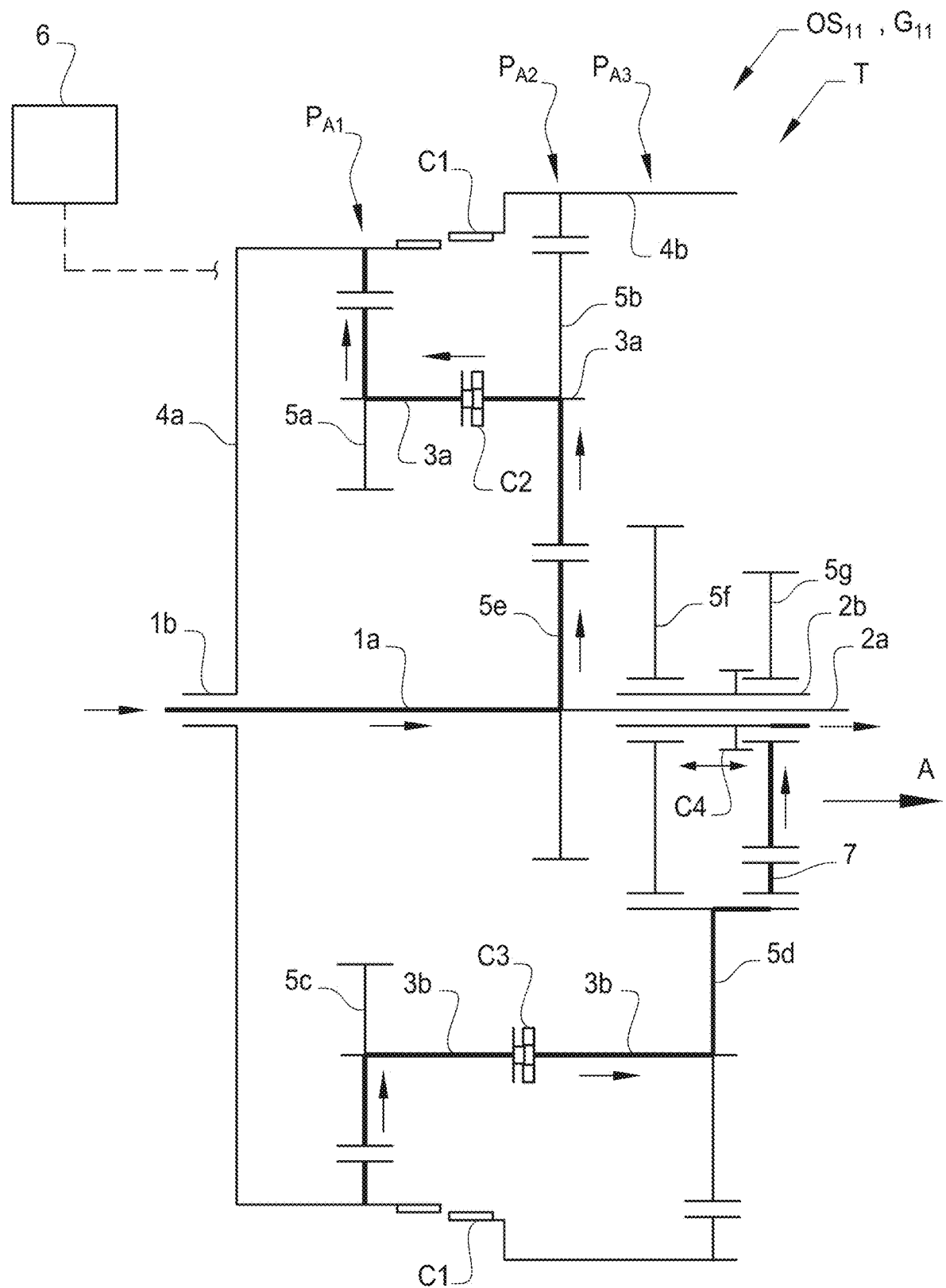
FIG. 5B shows schematically, a layout view of the multi-speed transmission of the alternative embodiment in an operational step providing an eleventh gear ratio according to the disclosure.

In FIG. 5B, a layout view of the multi-speed transmission T in an eleventh operational step $OS_{11}$ providing an eleventh gear ratio $G_{11}$ is schematically illustrated. In order to operate the transmission T in the eleventh operational step $OS_{11}$, a command may be received from the control unit 6 for operating the transmission T with the eleventh gear ratio $G_{11}$, by: disconnecting the first clutch C1, connecting the second clutch C2, connecting the third clutch C3, and connecting the seventh gear wheel 5g to the second output shaft 2b with the fourth clutch C4; and transferring torque from the first input shaft 1a to the second output shaft 2b via the fifth gear wheel 5e, the second gear wheel 5b, the first gear wheel 5a, the first ring gear 4a, the third gear wheel 5c, the fourth gear wheel 5d, the idler gear 7, and the seventh gear wheel 5g, for providing the eleventh gear ratio $G_{11}$. The torque transfer path is illustrated with arrows in the figure. This operational step is providing a driving gear, where the rotational direction of the output shaft is opposite the rotational direction of the input shaft. If instead connecting the sixth gear wheel 5f to the second output shaft 2b with the fourth clutch C4, the transmission T is operated in the same way as illustrated in FIG. 3I.

The present disclosure has been presented above with reference to specific embodiments. However, other embodiments than the above described are possible and within the scope of the disclosure. Different method steps than those described above, performing the method by hardware or software, may be provided within the scope of the disclosure. Thus, according to an exemplary embodiment, there is provided a non-transitory computer-readable storage medium storing one or more programs configured to be executed by one or more processors of the transmission system or the control unit of the transmission system, the one or more programs comprising instructions for performing the method according to any one of the above-discussed embodiments. Alternatively, according to another exemplary embodiment a cloud computing system can be configured to perform any of the method aspects presented herein. The cloud computing system may comprise distributed cloud computing resources that jointly perform the method aspects presented herein under control of one or more computer program products. Moreover, the processor may be connected to one or more communication interfaces and/or sensor interfaces for receiving/transmitting data with external entities such as e.g. sensors arranged on the vehicle surface, an off-site server, or a cloud-based server.

The processor or processors of the transmission system or the control unit associated with the transmission system may be or include any number of hardware components for conducting data or signal processing or for executing computer code stored in memory. The system may have an associated memory, and the memory may be one or more devices for storing data and/or computer code for completing or facilitating the various methods described in the present description. The memory may include volatile memory or non-volatile memory. The memory may include database components, object code components, script components, or any other type of information structure for supporting the various activities of the present description. According to an exemplary embodiment, any distributed or local memory device may be utilized with the systems and methods of this description. According to an exemplary embodiment the memory is communicably connected to the processor (e.g., via a circuit or any other wired, wireless, or network connection) and includes computer code for executing one or more processes described herein.

It will be appreciated that the above description is merely exemplary in nature and is not intended to limit the present disclosure, its application or uses. While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description and the appended claims. Reference signs mentioned in the claims should not be seen as limiting the extent of the matter protected by the claims, and their sole function is to make claims easier to understand.

REFERENCE SIGNS

1a: First input shaft
1b: Second input shaft
2a: First output shaft
2b: Second output shaft
3a: First intermediate shaft
3b: Second intermediate shaft
4a: First ring gear
4b: Second ring gear
5a: First gear wheel
5b: Second gear wheel
5c: Third gear wheel
5d: Fourth gear wheel
5e: Fifth gear wheel
5f: Sixth gear wheel
6: Control unit
7: Idler gear
A: Axial direction
C1: First clutch
C2: Second clutch
C3: Third clutch
C4: Fourth clutch
G: Gear ratio
OS: Operational step
$P_{A1}$: First axial plane
$P_{A2}$: Second axial plane
$P_{A3}$: Third axial plane
T: Transmission

What is claimed is:
1. A multi-speed transmission for a vehicle, wherein the transmission has an extension in an axial direction and comprises a first input shaft, a second input shaft, a first output shaft, a second output shaft, a first intermediate shaft and a second intermediate shaft,
   wherein the transmission further comprises an annulus internally toothed first ring gear drivingly connected to the second input shaft and an annulus internally toothed second ring gear releasably connected to the first ring gear,
   wherein the first intermediate shaft comprises a first gear wheel in engagement with the first ring gear and a second gear wheel in engagement with the second ring gear, wherein the second intermediate shaft comprises a third gear wheel in engagement with the first ring gear and a fourth gear wheel in engagement with the second ring gear,
   wherein the first output shaft comprises a fifth gear wheel in engagement with second gear wheel, and the second output shaft comprises a sixth gear wheel in engagement with the fourth gear wheel, wherein the first ring gear, the first gear wheel, and the third gear wheel are arranged in a first axial plane; wherein the second ring gear, the second gear wheel, and the fifth gear wheel are arranged in a second axial plane; and wherein the second ring gear, the fourth gear wheel, and the sixth gear wheel are arranged in a third axial plane.

2. The multi-speed transmission according to claim 1, wherein the first ring gear and the second ring gear are concentrically arranged in relation to each other and separated in the axial direction, wherein the first ring gear and the second ring gear are releasably connected to each other via a first clutch;
  wherein the first intermediate shaft comprises a second clutch arranged between the first gear wheel and the second gear wheel, wherein the first gear wheel and the second gear wheel are releasably connected to each other via the second clutch; and
  wherein the second intermediate shaft comprises a third clutch arranged between the third gear wheel and the fourth gear wheel, wherein the third gear wheel and the fourth gear wheel are releasably connected to each other via the third clutch.

3. The multi-speed transmission according to claim 1, wherein the first input shaft and the first output shaft are connected to each other and formed as a common shaft structure extending in the axial direction.

4. The multi-speed transmission according to claim 1, wherein the first axial plane, the second axial plane, and the third axial plane, are arranged in a parallel relationship to each other and separated in the axial direction of the transmission.

5. The multi-speed transmission according to claim 1, wherein the first input shaft, the second input shaft, the first output shaft, the second output shaft, the first intermediate shaft and the second intermediate shaft, are arranged in a parallel relationship to each other in the axial direction of the transmission.

6. The multi-speed transmission according to claim 1, wherein the first input shaft and the second input shaft are concentrically arranged in relation to each other, wherein the first input shaft is arranged as an inner shaft and the second input shaft as an outer shaft concentrically outside the first input shaft; and wherein the first output shaft and the second output shaft are concentrically arranged in relation to each other, wherein the first output shaft is arranged as an inner shaft and the second output shaft as an outer shaft concentrically outside the first output shaft.

7. The multi-speed transmission according to claim 1, wherein the first gear wheel and the third gear wheel are arranged on radially opposite sides of the first input gear shaft and the first output gear shaft; wherein the second gear wheel and the fourth gear wheel are arranged on radially opposite sides of the first input gear shaft and the first output gear shaft.

8. The multi-speed transmission according to claim 1, wherein the second output shaft further comprises a seventh gear wheel in engagement with the fourth gear wheel via an idler gear, and wherein the second output shaft comprises a fourth clutch arranged for selectively connecting one of the sixth gear wheel and the seventh gear wheel to the second output shaft and disconnecting the other of the sixth gear wheel and the seventh gear wheel from the second output shaft.

9. A vehicle comprising the multi-speed transmission according to claim 1.

10. A method for operating a multi-speed transmission for a vehicle, wherein the transmission has an extension in an axial direction and comprises a first input shaft, a second input shaft, a first output shaft, a second output shaft, a first intermediate shaft and a second intermediate shaft,
  wherein the transmission further comprises an annulus internally toothed first ring gear drivingly connected to the second input shaft and an annulus internally toothed second ring gear releasably connected to the first ring gear,
  wherein the first intermediate shaft comprises a first gear wheel in engagement with the first ring gear and a second gear wheel in engagement with the second ring gear, wherein the second intermediate shaft comprises a third gear wheel in engagement with the first ring gear and a fourth gear wheel in engagement with the second ring gear,
  wherein the first output shaft comprises a fifth gear wheel in engagement with the second gear wheel, and the second output shaft comprises a sixth gear wheel in engagement with the fourth gear wheel,
  wherein the first ring gear, the first gear wheel, and the third gear wheel are arranged in a first axial plane; wherein the second ring gear, the second gear wheel, and the fifth gear wheel are arranged in a second axial plane; and wherein the second ring gear, the fourth gear wheel, and the sixth gear wheel are arranged in a third axial plane;
  wherein the first ring gear and the second ring gear are releasably connected to each other via a first clutch, wherein the first gear wheel and the second gear wheel are releasably connected to each other via a second clutch arranged on the first intermediate shaft, and wherein the third gear wheel and the fourth gear wheel are releasably connected to each other via a third clutch arranged on the second intermediate shaft; wherein the method comprises the steps:
  operating the first clutch, the second clutch, and the third clutch between connected and disconnected modes for providing different gear ratios of the multi-speed transmission.

11. The method according to claim 10, wherein the method further comprises the steps: receiving a command for operating the transmission with a first gear ratio; transferring torque from the first input shaft directly to the first output shaft for providing the first gear ratio.

12. The method according to claim 10, wherein the method further comprises the steps: receiving a command for operating the transmission with a second gear ratio or a seventh gear ratio; connecting the first clutch, disconnecting the second clutch, and disconnecting the third clutch; and
  transferring torque from the second input shaft to the first output shaft via the first ring gear, the second ring gear, the second gear wheel, and the fifth gear wheel, for providing the second gear ratio, or transferring torque from the second input shaft to the second output shaft via the first ring gear, the second ring gear, the fourth gear wheel, and the sixth gear wheel, for providing the seventh gear ratio.

13. The method according to claim 10, wherein the method further comprises the steps: receiving a command for operating the transmission with a third gear ratio or a fourth gear ratio; disconnecting the first clutch, connecting the second clutch, and disconnecting the third clutch; and
  transferring torque from the second input shaft to the second output shaft via the first ring gear, the first gear wheel, the second gear wheel, the second ring gear, the fourth gear wheel, and the sixth gear wheel, for providing the third gear ratio, or transferring torque from the second input shaft to the first output shaft via the first ring gear, the first gear wheel, the second gear wheel, and the fifth gear wheel, for providing the fourth gear ratio.

14. The method according to claim 10, wherein the method further comprises the steps: receiving a command for operating the transmission with a fifth gear ratio or a sixth gear ratio; disconnecting the first clutch, disconnecting the second clutch, and connecting the third clutch; and transferring torque from the second input shaft to the second output shaft via the first ring gear, the third gear wheel, the fourth gear wheel, and the sixth gear wheel, for providing the fifth gear ratio, or transferring torque from the second input shaft to the first output shaft via the first ring gear, the third gear wheel, the fourth gear wheel, the second ring gear, the second gear wheel, and the fifth gear wheel, for providing the sixth gear ratio.

15. The method according to claim 10, wherein the method further comprises the steps: receiving a command for operating the transmission with an eighth gear ratio; disconnecting the first clutch, disconnecting the second clutch, and disconnecting the third clutch; transferring torque from the first input shaft to the second output shaft via the fifth gear wheel, the second gear wheel, the second ring gear, the fourth gear wheel, and the sixth gear wheel, for providing the eight gear ratio; or wherein the method further comprises the steps: receiving a command for operating the transmission with a ninth gear ratio; disconnecting the first clutch, connecting the second clutch, and connecting the third clutch; transferring torque from the first input shaft to the second output shaft via the fifth gear wheel, the second gear wheel, the first gear wheel, the first ring gear, the third gear wheel, the fourth gear wheel, and the sixth gear wheel, for providing the ninth gear ratio.

* * * * *